July 5, 1949.  P. K. McGALL  2,475,104
TESTING DEVICE FOR CAMERA SYNCHRONIZERS
Filed May 8, 1946
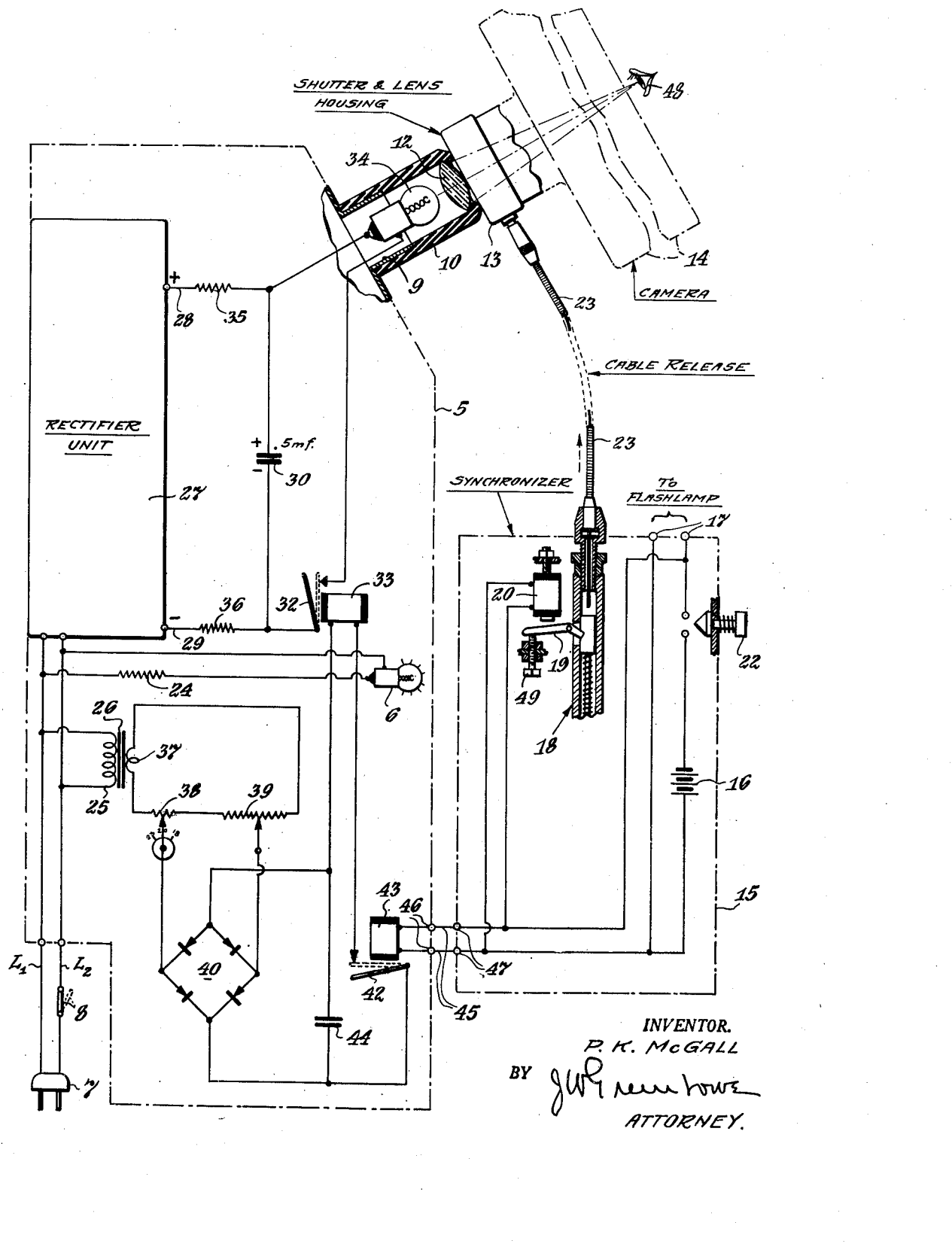
INVENTOR.
P. K. McGALL
BY J W Greenhowe
ATTORNEY.

Patented July 5, 1949

2,475,104

UNITED STATES PATENT OFFICE 2,475,104

TESTING DEVICE FOR CAMERA SYNCHRONIZERS

Philip K. McGall, Orange, N. J., assignor to Samuel Mendelsohn, Montclair, N. J.

Application May 8, 1946, Serial No. 668,111

6 Claims. (Cl. 73—5)

The present invention relates to a testing device for regulating the opening of a camera shutter, so that the latter can be accurately timed with a camera synchronizer of the type now commonly employed in the photographic art, for causing complete opening of a camera shutter simultaneously with the moment of peak intensity from a photoflash lamp, and constitutes an improvement on the device as shown in Patent No. 2,332,587, issued October 26, 1943, to Samuel Mendelsohn and the present applicant, as co-inventors.

Prior to the time the testing device, as shown in this Mendelsohn et al. patent was invented, it was the usual practice for the manufacturer to set each synchronizing apparatus at the factory and should such apparatus get out of adjustment during usage it was necessary to return it to the factory for re-adjustment. Accordingly the photographer would be without his synchronizer for the interim required to return it to the factory for repairs and shipment to and from the factory entailed some expense.

The testing device described in the above noted Mendelsohn et al. patent eliminated these disadvantages since it can be readily employed by any camera dealer and only a few minutes is required to properly adjust the synchronizer. Such testing device is, however, subject to the disadvantage that the operator cannot readily determine from immediate observation whether the synchronizer is fast or slow and must make such determination empirically.

It is accordingly an object of the present invention to provide a synchronizer tester for accurately timing the operation of a camera shutter to synchronize complete opening of the shutter with the moment of peak intensity of a photoflash lamp and whereby the operator may determine immediately whether a synchronizer is operating fast or slow.

Another object of the present invention is the provision of a synchronizer tester which is accurate and reliable for timing the operation of a camera shutter to synchronize the complete opening of the shutter with the moment of peak intensity of a photoflash lamp and which is substantially insensitive to line voltage fluctuations.

A further object of the present invention is the provision of a synchronizer tester for accurately timing the operation of a camera shutter to synchronize the complete opening of the shutter with the moment of peak intensity of a photoflash lamp, wherein the tester is operated by the source of electrical energy for the synchronizer regardless of a variation in the voltage of the latter, and the operator can readily discern whether the synchronizer is fast or slow for purposes of required adjustment.

Still further objects of the present invention will become obvious to those skilled in the art by reference to the accompanying drawing, wherein the single figure is a schematic illustration of the synchronizer tester constructed in accordance with the present invention.

Referring now to the drawing in detail the testing apparatus is enclosed within a cabinet, shown by the dash and dot lines 5, and is provided with a signal lamp 6 in the form of a jewel bull's-eye for indicating when the tester is connected to a source of electrical supply of the customary domestic potential of 115 volts through an attachment plug 7, upon closure of the energizing switch 8.

Extending from a sloping wall of the cabinet 5 is an annular projection or hub 9 surrounded by a resilient collar 10 of yieldable rubber or the like and a lens 12 is positioned interiorly of and at one end of the collar 10 to form a window, so that a camera shutter 13 of a camera 14 may be pressed against the yieldable collar or window 10, thus preventing extraneous light from striking the camera shutter 13. The synchronizer to be synchronized with the camera shutter 13 may be of any type but is illustrated as being of the type shown in Patent No. 2,204,424, issued June 11, 1940, to Samuel Mendelsohn, to whom the present application is assigned.

Inasmuch as the synchronizer per se forms no part of the present invention, it is believed unnecessary that it be herein described in detail. As schematically shown it comprises a battery case shown by the dash and dot lines 15 housing the usual two or three cell flashlight batteries 16 and a pair of terminals 17 which connect to the usual photoflash lamp (not shown). Also affixed to the battery case is the synchronizer mechanism shown generally at 18 which is first "cocked" and held in this position by the armature 19 of a solenoid 20 until the latter is energized by depression of a switch 22. Since the mechanism 18 is connected by a cable release 23 to the camera shutter 13, operation of the mechanism 18 by energization of the solenoid 20 simultaneously with energization of the photoflash lamp connected to the terminals 17, causes opening of the camera shutter 13 by movement of the cable release 23.

Referring now to the tester within the cabinet 5 it is first connected to a source of supply by attaching the plug 7 to the usual receptacle and when it is desired to test the camera shutter 13, the hand switch 8 is closed, to the position shown in full lines in the drawing, which energizes the signal lamp 6 from the mains L1—L2 through a resistance 24. At the same time the primary winding 25 of a low-voltage transformer 26 receives 115 volts from the mains L1—L2, which mains L1—L2 also energize a rectifier unit 27.

This rectifier unit may be of any type well known in the art which converts the 115 volt A. C. from source L1—L2 into unidirectional or direct current of 250 volts D. C. One such unit comprises a pair of condensers each of which is charged during alternate half waves of the A. C. cycle through a rectifier valve, thus producing a voltage doubling output circuit represented by the conductors 28 and 29, which are connected to a condenser 30 having a capacity of about 0.5 microfarad so as to charge the latter to a voltage of approximately 250 volts. Moreover, once this condenser 30 is completely charged at this D. C. potential of 250 volts, its output or discharge voltage will remain constant regardless of fluctuations of the supply source L1—L2.

Upon attraction of an armature 32 of a pony relay 33 this condenser 30 discharges through a gaseous discharge lamp 34, such as a small neon flasher lamp, disposed within the collar 10, rearwardly of the lens 12. The condenser 30 together with its charging circuit thus constitutes an energizing source for the lamp 34. The output circuit of the rectifier unit which charges the condenser 30, is provided with resistances 35 and 36 of about 3 to 5 megohms each, to prevent a continuous glowing of the lamp 34 and thus to restrict lighting of the latter to the moment of discharging of condenser 30.

The secondary winding 37 of transformer 26, delivers a current of approximately 2 amperes at 6 to 7 volts and is connected through a potentiometer 38—39 and a rectifier unit 40, to the winding of the pony relay 33, upon attraction of the armature 42 of a micro-relay 43. A condenser 44 of about 250 mfd. capacity is connected across the output circuit of the rectifier unit 40 to supply constant voltage when it is completely charged, to the pony relay 33. The energizing circuit for relay 33 thus constitutes a control for the energization of the lamp 34. The winding of micro-relay 43, which together with its armature 42 causes closure of the control circuit including relay 33, is arranged to be connected, by a two conductor cable 45 extending between terminals 46 on the tester cabinet and terminals 47 on the battery case 15, to the batteries 16 upon depression of the push-button 22 and the relay 43 may be thus said to substitute for the usual photoflash lamp.

Potentiometer 38 of about 3 ohms is operated by a knob from the face of the cabinet 5 and has three settings each of which produces a rectified voltage supplied to pony relay 33 of approximately 3.3, 4.1 and 4.8 volts and corresponding to flash durations of 23, 20 and 18 milliseconds, respectively, while potentiometer 39 of about 10 ohms is used for coarse adjustment to originally set the tester for the standard photoflash duration of 20 milliseconds. In other words potentiometer 38 is turned to its 20 millisecond position and adjustment of potentiometer 39 then made until the synchronizer operates in 20 milliseconds which is the initial factory setting of the tester and corresponds to the time for a standard photo- flash lamp to reach peak intensity. Afterward potentiometer 38 is moved to its other positions of 18 and 23 milliseconds only during testing to determine whether a given camera shutter is faster or slower than 20 milliseconds. The potentiometer 38—39 when adjusted to the desired setting thus operates as time delay means corresponding to that of flash to peak intensity of a standard photoflash lamp, as well for a lamp faster or slower than standard, depending upon the potentiometer setting.

When it is desired to operate the testing apparatus to synchronize a camera shutter and a synchronizer, the tester 5 is connected by the plug 7 to a source of supply and the switch 8 closed, as previously mentioned. This not only lights the signal or pilot lamp 6 but also causes the rectifier unit 27 to charge condenser 30 as well as causing the transformer secondary winding 37 to become energized. The camera shutter 13 being in front of the window 10 the operator then depresses the button or switch 22 while gazing with his eye 48 through the shutter toward the flash lamp 34.

Closure of switch 22 accordingly completes circuits from the batteries 16 to the winding of synchronizer relay or solenoid 20 and to micro-relay 43 causing such relays to attract their respective armatures 19 and 42. Relay 43 being exceedingly sensitive is responsive to small current flow and hence consumes very little power from the batteries 16. Movement of the armature 19 of solenoid 20 trips the previously cocked synchronizer mechanism 18, causing the latter to move upwardly, as shown in the drawing, and causing movement of the cable release 23 with attendant opening of the camera shutter 13.

During this brief interim taken for the foregoing to occur, the micro-relay 43 will have operated by movement of its armature 42 to close the previously mentioned control circuit to the pony relay 33. Energization of the relay 33 to actuate its armature 32 completes the discharge circuit for condenser 30 through the gaseous discharge lamp 34 causing momentary intense flashing of the latter. The time required for this flashing to occur, following depression of switch 22, is previously fixed at 20 milliseconds. The setting of potentiometer 38—39 affords sufficient time delay in the operation of the control circuit to correspond to the characteristics of a standard photoflash lamp as to time of ignition, duration of flash and ignition current from batteries 16. The operator accordingly observes the flashing of the lamp 34 through the camera shutter 13. If a configuration is observed such as a star shape, the operator knows that the shutter is not completely open at the moment of flash but he could not, prior to the present invention, determine whether or not the shutter was fast or slow, except by tedious empirical adjustment of the synchronizer.

In accordance with the present invention the operator need only rotate the potentiometer knob 38 to the 23 millisecond position and then repeat the operation by depressing the switch 22 and observing the flash of lamp 34 through the shutter. If the shutter was slow on the first test it should now be so completely open that no configuration can be observed since the time for the flash to occur required 23 milliseconds. Should a slight configuration be observed the operator then knows that he must speed operation of the synchronizer by lessening the distance the armature 19 of solenoid 20 travels before tripping which is accomplished by movement of adjustment screw 49. The knob of potentiometer 38 is then again moved to its 20 milliseconds position and an "exposure" repeated. When the synchronizer is properly adjusted the shutter will be determined as completely opening at the instant of flashing of lamp 34 by the absence of any configuration and the observation of a general blur of illumination.

The reverse is likewise true should the camera synchronizer be too fast. To determine this condition, particularly for high-speed camera shutters, the operator sets the potentiometer knob 38 on the 18 milliseconds position and makes an observation. Should this show practically a complete opening of the shutter in 18 milliseconds he then returns the knob 38 to its 20 milliseconds position and slows down the synchronizer 18 by increasing the distance the armature 19 must travel before tripping the synchronizer mechanism.

It can thus be readily seen by those skilled in the art that a synchronizer tester is herein provided which is accurately and reliably operable to precisely synchronize the complete opening of a camera shutter with the moment of peak intensity of a photoflash lamp. Moreover, the operator can with speed and facility determine whether the camera shutter is fast or slow thus immediately ascertaining the required adjustment to effect complete synchronism. The synchronizer tester of the present invention requires very little power for operation and is also substantially insensitive to voltage fluctuations both from the main source of supply and the control or tripping source, constituting the synchronizer batteries.

Although one embodiment of the present invention has been shown and described it is to be understood that other modifications thereof may be made without departing from the spirit and scope of the appended claims.

What is claimed is:

1. A device for testing a camera synchronizer for adjustment to produce the peak intensity of a photoflash lamp at the moment of complete opening of a camera shutter, comprising a light source, energizing means to produce illumination from said light source, preset means to initially set the duration of illumination to simulate the peak intensity of a standard photoflash lamp, means operable by an operator to control said energizing means to vary the time of duration of said illumination to simulate a plurality of peak intensity periods produced by photoflash lamps in addition to that of said standard lamp and actuating means operable by said synchronizer under test to cause an operation of said controlling means to momentarily illuminate said light source at different time durations for adjustment of said synchronizer to coincide with a selected period of time duration of said illumination occurring simultaneously with complete opening of said camera shutter.

2. An electrical system for testing a camera synchronizer for adjustment to operate at the peak intensity of a photoflash lamp simultaneously with the complete opening of a camera shutter, comprising a light source, energizing means to produce illumination from said light source, preset means for controlling said energizing means to produce illumination from said light source for a period of time duration equal to that of a standard photoflash lamp, means operable by an operator for controlling said energizing means to produce illumination from said light source for periods of time of lesser and greater duration than said standard photoflash lamp and actuating means operable by said synchronizer to cause an operation of said controlling means to produce illumination for said different periods of duration for adjustment of said synchronizer to coincide with said standard period of time duration when occurring simultaneously with complete opening of said camera shutter.

3. A synchronizing tester for accurately adjusting a synchronizing device normally operable to cause complete opening of a given camera shutter simultaneously with the moment of peak intensity from a photoflash lamp comprising a light source, energizing means adapted to cause said light source to produce momentary illumination symbolic of the moment of peak intensity of a photoflash lamp, control means adapted to be operated by an operator to cause operation of said energizing means and including a visual adjustable member for regulating the time delay of the flash to peak intensity of said light source so as to correspond to that of a standard photoflash lamp as well as greater and less than that of a standard photoflash lamp, and actuating means operable by said synchronizing device under test to cause operation of said control means with attendant operation of said energizing means to momentarily illuminate said light source simultaneously with opening of a given camera shutter of said synchronizing device, to enable an observer to view the momentary illumination of said light source through the open camera shutter and determine from the setting of said adjustable member whether the synchronizing device under test is faster or slower in completely opening the given camera shutter at the instant of momentary illumination of said light source in order to ascertain the required adjustment for the synchronizing device to precisely synchronize the complete opening of the given camera shutter with the moment of peak intensity of a standard photoflash lamp.

4. A synchronizing tester for accurately adjusting a synchronizing device normally operable to cause complete opening of a given camera shutter simultaneously with the moment of peak intensity from a photoflash lamp comprising a light source, energy storage means for accumulating a direct current and adapted to be connected to said light source to cause the latter to produce momentary illumination symbolic of the moment of peak intensity of a photoflash lamp, control means adapted to be operated by an operator to cause connection of said energy storage means to said light source including a visual adjustable member for regulating the time delay of the flash to peak intensity of said light source so as to correspond to that of a standard photoflash lamp as well as greater and less than that of a standard photoflash lamp, and actuating means operable by said synchronizing device under test to cause operation of said control means simultaneously with opening of the given camera shutter by said synchronizing device, to enable an observer to view the momentary illumination of said light source through the open camera shutter and determine from the setting of said adjustable member whether the synchronizing device under test is faster or slower in completely opening the given camera shutter at the instant of momentary illumination of said light source in order to ascertain the required adjustment for the synchronizing device to precisely synchronize the complete opening of the given camera shutter with the moment of peak intensity of a standard photoflash lamp.

5. A synchronizing tester for accurately adjusting a synchronizing device normally operable to cause complete opening of a given camera shutter simultaneously with the moment of peak intensity from a photoflash lamp comprising a light source, energy storage means for accumulating a direct current and adapted to be connected to said light source to cause the latter to produce momentary illumination symbolic of the moment of peak intensity of a photoflash lamp, a constant-low-voltage-control circuit including a relay operable to cause connection of said energy storage means to said light source and a visual adjustable member for regulating the time delay in the operation of said relay prior to connecting said energy storage means to said light source so as to correspond to that of flash to peak intensity of a standard photoflash lamp, and actuating means operable by said synchronizing device under test to cause operation of said relay by closure of said control circuit simultaneously with opening of the given camera shutter by said synchronizing device, to enable an observer to view the momentary illumination of said light source through the open camera shutter and determine from the setting of said adjustable member whether the synchronizing device under test is faster or slower in completely opening the given camera shutter at the instant of momentary illumination of said light source in order to ascertain the required adjustment for the synchronizing device to precisely synchronize the complete opening of the given camera shutter with the moment of peak intensity of a standard photoflash lamp.

6. A synchronizing tester for accurately adjusting a synchronizing device normally operable to cause complete opening of a given camera shutter simultaneously with the moment of peak intensity from a photoflash lamp comprising a light source, energy storage means for accumulating a direct current and adapted to be connected to said light source to cause the latter to produce momentary illumination symbolic of the moment of peak intensity of a photoflash lamp, a constant-low-voltage control circuit including a pony relay operable to cause connection of said energy storage means to said light source and a visual adjustable member for regulating the time delay in the operation of said pony relay prior to connecting said energy storage means to said light source so as to correspond to that of flash to peak intensity of a standard photoflash lamp as well as greater and less than that of a standard photoflash lamp, and actuating means including a micro-relay operable by said synchronizing device under test to cause operation of said pony relay simultaneously with opening of the given camera shutter by said synchronizing device, to enable an observer to view the momentary illumination of said light source through the open camera shutter and determine from the setting of said adjustable member whether the synchronizing device under test is faster or slower in completely opening the given camera shutter at the instant of momentary illumination of said light source in order to ascertain the required adjustment for the synchronizing device to precisely synchronize the complete opening of the given camera shutter with the moment of peak intensity of a standard photoflash lamp.

PHILIP K. McGALL.

REFERENCES CITED

The following references are of record in the file of this patent:

UNITED STATES PATENTS

| Number | Name | Date |
|---|---|---|
| 1,782,100 | Schleicher et al. | Nov. 18, 1930 |
| 2,123,063 | Peters | July 5, 1938 |
| 2,265,039 | Harder | Dec. 2, 1941 |
| 2,332,587 | Mendelsohn et al. | Oct. 26, 1943 |
| 2,360,068 | Martindell | Oct. 10, 1944 |